(12) United States Patent
Quadir et al.

(10) Patent No.: US 7,670,979 B2
(45) Date of Patent: Mar. 2, 2010

(54) POROUS SILICON CARBIDE

(75) Inventors: Tariq Quadir, Wooster, OH (US); Corey Dunn, Fairport, NY (US)

(73) Assignee: CerCo LLC, Cleveland, OH (US)

( * ) Notice: Subject to any disclaimer, the term of this patent is extended or adjusted under 35 U.S.C. 154(b) by 203 days.

(21) Appl. No.: 11/867,783

(22) Filed: Oct. 5, 2007

(65) Prior Publication Data

US 2009/0093358 A1  Apr. 9, 2009

(51) Int. Cl.
*C04B 38/02* (2006.01)
*C04B 35/565* (2006.01)
*C04B 35/563* (2006.01)

(52) U.S. Cl. .............................. 501/80; 501/84; 501/85; 501/91; 501/92; 264/43; 264/282

(58) Field of Classification Search ................... 501/80, 501/84, 85, 88, 99, 91; 264/42, 43, 44, 682
See application file for complete search history.

(56) References Cited

U.S. PATENT DOCUMENTS

| 4,514,346 | A | 4/1985 | Luhleich et al. |
| 4,777,152 | A | 10/1988 | Tsukada |
| 4,863,798 | A | 9/1989 | Arenz et al. |
| 5,202,105 | A | 4/1993 | Boecker et al. |
| 5,358,910 | A | 10/1994 | Atwell et al. |
| 5,441,799 | A | 8/1995 | Owens et al. |
| 5,469,773 | A | 11/1995 | Tarpinian |
| 5,585,313 | A | 12/1996 | Shobu et al. |
| 5,707,065 | A | 1/1998 | Azema et al. |
| 6,214,078 | B1 | 4/2001 | Way et al. |
| 6,555,031 | B2 | 4/2003 | Gadkaree et al. |
| 6,609,452 | B1 | 8/2003 | McCormick et al. |
| 6,764,620 | B1 | 7/2004 | Palmisiano et al. |
| 6,862,970 | B2 | 3/2005 | Aghajanian et al. |
| 6,887,809 | B1 * | 5/2005 | Adler .......................... 501/88 |
| 7,104,177 | B1 | 9/2006 | Aghajanian et al. |

FOREIGN PATENT DOCUMENTS

JP          090132478      *   5/1997

* cited by examiner

*Primary Examiner*—Karl E Group
(74) *Attorney, Agent, or Firm*—Rankin, Hill & Clark LLP

(57) ABSTRACT

A porous refractory product includes a matrix of sintered silicon carbide having a porosity of about 45% to about 65%. The matrix is formed by heating in a noble gas atmosphere a cast preform including a mixture of alpha-silicon carbide and boron carbide each having a particle size of less than about 1 micron. The heating causes the formation of gaseous SiO within the silicon carbide matrix, which, in turn, forms pores having an average size of less than about 1 micron. The porous refractory products herein are suitable for use in a variety of applications including for use in high temperature particulate filtering applications.

12 Claims, 3 Drawing Sheets

POROUS SILICON CARBIDE

BACKGROUND OF THE INVENTION

1. Field of Invention

This invention relates to porous ceramic or refractory products suitable for a variety of applications wherein a porous product is desired. More particularly, the invention concerns a porous ceramic product made of silicon carbide and a method of making the same. The product of the present invention is especially well suited for use in the production of diesel particulate filters.

2. Description of Related Art

Porous ceramic materials are known in the prior art, including porous silicon carbide. Such porous silicon carbide is discussed for example in Shobu et al. U.S. Pat. No. 5,585,313, Atwell et al. U.S. Pat. No. 5,358,910, Gadkaree et al. U.S. Pat. No. 6,555,031 and Way et al. U.S. Pat. No. 6,214,078. Various methods are used to produce porous silicon carbide, but generally, such methods employ a select grade of silicon carbide and elevated firing temperatures that exceed 2300° C.

Porous ceramic materials are used in a variety of applications including high temperature filters as discussed in Way et al.; diffusers as discussed in Veeder et al. U.S. Pat. No. 5,863,031; diesel particulate filters as discussed in Nagi et al. U.S. Pat. No. 5,863,311; Ban et al. U.S. Pat. Nos. 5,961,931 and 6,024,927 and Cheng U.S. Pat. No. 6,835,224; and in armor applications as discussed in Tarpinian U.S. Pat. No. 5,469,773, McCormick et al. U.S. Pat. No. 6,609,452 and Aghajanian et al. U.S. Pat. No. 7,104,177. All twelve of the aforementioned patent documents are incorporated herein by reference The present invention provides a porous silicon carbide and a method of making the same that offers several distinct advantages over porous products of the prior art. For example, the present invention provides a product that displays uniform porosity and it does not require the use of a special distribution of silicon carbide particles as taught by Way et al. Additionally, the process of the present invention does not require the elevated firing temperatures as taught by Way et al., Shobu et al., Atwell et al. and Gadkaree et al. Further, the porous product of the present invention may be produced without the use of expensive thermoplastic binders as taught by Atwell et al. and Gadkaree et al.

SUMMARY OF THE INVENTION

The present invention provides a porous silicon carbide product, and methods for making it, the product being suitable for use in a variety of applications where a product of uniform porosity is required.

The product comprises a porous matrix of sintered silicon carbide having a controlled porosity of about 45 to about 65 vol % and an average pore size of less than about 1 micron. Significantly, the initial size distribution of silicon carbide particles required to achieve the foregoing porosity and pore size values is not critical. Further, no free carbon is needed, such as that provided by polymers as employed in prior art methods. It will be appreciated that the inventive compositions are formed largely of sintered silicon carbide, with a relatively small content of boron carbide, and it is not a recrystallized silicon carbide product.

The porous product is produced by combining silicon carbide grains or particles with a sintering agent, which upon firing, produces a vapor species (SiO) that forms pores in the ceramic monolith with a controlled porosity. Desired permeability and pore size can be obtained by controlling the firing temperature and the quantity of sintering agent included.

In particular, the invention involves a permeable refractory product comprising a matrix of sintered silicon carbide having a porosity of about 45% to about 65%, said matrix being formed by spray drying and heating in a noble gas atmosphere a mixture comprising alpha-silicon carbide and boron carbide each having a particle size of less than about 1 micron, wherein upon heating an oxide layer on the silicon carbide particles decomposes and reacts to form gaseous SiO resulting in the formation of pores having an average size of less than about 1 micron in the silicon carbide matrix.

A second embodiment of the invention is a method of making a permeable refractory product having a porosity of about 45% to about 65%, comprising forming a matrix by spray drying and heating in a noble gas atmosphere mixture comprising alpha-silicon carbide and boron carbide each having a particle size of less than about 1 micron, said heating causing the decomposition and reaction of the oxide layer on the silicon carbide matrix and the formation of gaseous SiO within the silicon carbide matrix to form pores having an average size of less than about 1 micron.

A further embodiment provides a method of making a porous silicon carbide article comprising combining the following to form a mixture comprising: 100 parts by weight (hereinafter "pbw") of α-silicon carbide having a particle size of about 0.5 microns to about 10 microns; about 0.2 to about 1 pbw of boron carbide; and about 1 to about 10 pbw of a vehicle. The mixture is milled in a milling agent or dispersant such as water for homogeneity and particle size reduction such that the resulting carbide particle size ($D_{50}$) is less than about 1 micron. The mixture is formed into a desired shape by conventional forming techniques such as slip casting, gel casting or pressure casting.

Because no special type of carbon source is required in the mix, various casting techniques may be utilized, and very complex shapes may be formed. The formed shape is sintered in a noble gas atmosphere at a temperature of about 2000 to about 2200° C. for a period of about 5 minutes to about 6 hours depending upon the configuration of the part being produced and the specific desired pore size. Prior to sintering, the mixture may be dried, for example by spray drying or other conventional techniques such as pressing.

Thus, in a preferred embodiment of the invention, a porous silicon carbide can be produced using a mixture that is devoid, or substantially devoid of free carbon and free silicon.

The porous silicon carbide of the present invention may be utilized in a variety of applications where good structural strength and uniform porosity is required. However, the silicon carbide of the present invention is especially well suited for use in the production of diesel particulate filters.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF THE INVENTION

Figure 1:
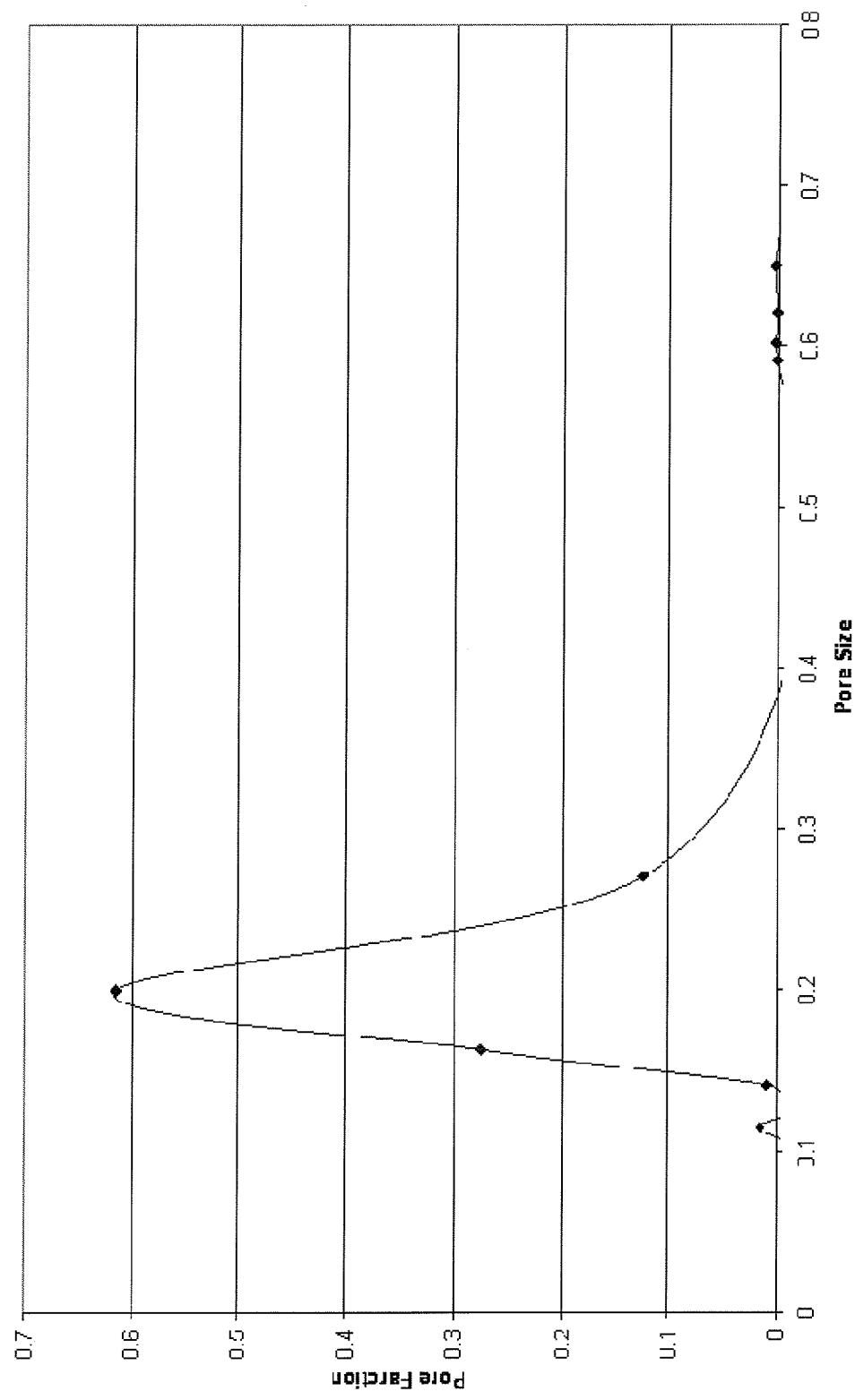
FIG. 1 is a photomicrograph of the porous silicon carbide according to an embodiment of the invention.

The present invention provides a porous refractory product suitable for a variety of applications including for use in filtering high temperature combustion products wherein the high temperature stream contains significant quantities of unwanted particulate matter. The refractory product comprises a matrix of sintered silicon carbide and a sintering agent. The matrix has a controlled porosity by volume of about 45% to about 65% and an average pore size less than about 1 micron. Significantly, no special size distribution of initial silicon carbide particles is required to achieve the foregoing porosity and pore size values. Further, no free carbon is needed; the carbon bound in the silicon carbide or sintering agent is sufficient. It will be appreciated that the invention is formed of sintered silicon carbide, and is not a recrystallized silicon carbide product.

Porous products may be produced by combining ceramic grains with a sintering agent, which, upon sintering at about 2100 to about 2200° C., produces a vapor species (SiO) which forms pores in the ceramic monolith with a controlled porosity. Desired permeability and pore size can be obtained by controlling the firing temperature and the relative quantity of sintering agent utilized.

In particular, the invention provides a method of making a porous silicon carbide article comprising combining the following to form a mixture: 100 parts by weight of α-silicon carbide having a particle size of about 0.5 microns to about 10 microns; about 0.2 to about 1 pbw of boron carbide; and about 1 to about 10 pbw of an organic vehicle. The mixture is milled for homogeneity and particle size reduction such that the carbide particle sizes ($D_{50}$) are less than about 1 micron and formed into a desired shape. The formed shape is sintered in a noble gas atmosphere at a temperature of about 2000 to about 2200° C. for about 5 minutes to about 6 hours to obtain a desired pore size.

An alternative embodiment of the invention provides a method of making a porous silicon carbide article comprising combining the following to form a mixture: 100 parts by weight of α-silicon carbide having a particle size of about 0.5 microns to about 10 microns; about 0.2 to about 1 pbw of boron carbide; and about 1 to about 10 pbw of an organic vehicle. In this embodiment, the mixture is devoid of free carbon and free silicon. The mixture is milled for homogeneity and particle size reduction such that the carbide particle sizes ($D_{50}$) are less than about 1 micron and formed into a desired shape. The formed shape is sintered in a noble gas atmosphere at a temperature of about 2000 to about 2200° C. for about 5 minutes to about 6 hours to obtain a desired pore size.

The mixtures herein may be sintered at a temperature of about 2000 to about 2200° C. for such a time as required to achieve an average porosity of about 45% to about 65%. Preferably, sintering is carried out at about 2100 to about 2200° C., more preferably, about 2125 to about 2175° C. Most preferably, sintering is carried out at about 2150° C.

The mixture is formed by combining the silicon carbide and boron carbide with an organic vehicle to form a green body, the binder comprising a dispersant and a solvent and forming a slurry having a viscosity of about 200 to about 700 cps, and about 45 to about 70 wt % solids. A dispersant is advantageously included to ensure complete wetting of all particles.

Various methods are used to produce porous silicon carbide are disclosed in the patents to Shobu, Atwell, Gadkaree and Way, as noted hereinabove. Generally, such methods employ a select grade of silicon carbide and elevated firing temperatures that exceed 2300° C.

Porous ceramic materials are used in a variety of applications including high temperature filters, diffusers, diesel particulate filters, and in armor applications.

The constituents used in the methods and products herein are detailed below.

Silicon Carbide. Particulate silicon carbide, devoid of free carbon and free silicon, having any particle size from about 0.5 microns to about 10 microns is suitable herein. Preferably, the SiC particles are about 1 micron to about 8 microns in diameter, more preferably about 3 to about 7 microns. No special particle morphology or particle size distribution is required.

Sintering Agent. In many situations, sintering agents containing metal ions (e.g., ZnO, $Al_2O_3$, etc) are viewed as impurities in the final silicon carbide matrix, and may have detrimental effects on a sintered SiC article. Without being bound by theory, it is believed that the presence of small quantities of boron in the silicon carbide matrix is beneficial, resulting in superior mechanical properties, such as flexural strength and modulus of rupture (MOR). For example, embodiments of the present invention result in sintered SiC products having small amounts of boron carbide incorporated therein. The modulus of rupture of such products can be in the range of about 8000 to about 10000 psi, while producing a porous SiC matrix having up to about 65 vol % porosity. Such boron is advantageously provided herein by the use of about 0.2 to about 1 pbw boron carbide ($B_4C$) per 100 pbw SiC, preferably about 0.3 to about 0.8 pbw, and more preferably about 0.4 to about 0.6 pbw $B_4C$ per 100 pbw SiC. The particle size and distribution of $B_4C$ is not critical, but it should be approximately in line with the particle size of the silicon carbide used. Preferably, the particle size and distribution of $B_4C$ particles matches those of SiC as closely as practicable.

Solvent. The organic vehicle is a binder in an organic solvent or a binder in water. The choice of binder used herein depends on the intended application; conventional binders such as ethyl cellulose, polyvinyl butanol, ethyl cellulose, and hydroxypropyl cellulose, and combinations thereof are appropriate together with a solvent. The organic solvent is also not critical and may be selected in accordance with a particular application method (i.e., printing or sheeting), from conventional organic solvents such as butyl carbitol, acetone, toluene, ethanol, diethylene glycol butyl ether; 2,2,4-trimethyl pentanediol monoisobutyrate (Texanol®); alpha-terpineol; beta-terpineol; gamma terpineol; tridecyl alcohol; diethylene glycol ethyl ether (Carbitol®), diethylene glycol butyl ether (Butyl Carbitol®), diethylene glycol dibutyl ether (Dibutyl Carbitol®) and propylene glycol; and blends thereof. Products sold under the Texanol® trademark are available from Eastman Chemical Company, Kingsport, Tenn.; those sold under the Dowanol® and Carbitol® trademarks are available from Dow Chemical Co., Midland, Mich. Alternatively, the vehicle for the ceramic slurry could be water.

When water is the solvent, the binder may be one or more of polyvinyl alcohol (PVA), polyethylene glycol (PEG), and polyvinyl acetate (PVAc), or combinations thereof.

The mixture in the methods and articles herein forming the porous articles may contain about 1 to about 10 pbw of organic vehicle per 100 parts of silicon carbide, preferably about 3 to about 8 pbw, more preferably about 4 to about 6 pbw. A preferred organic vehicle comprises PVA, PEG and water. The vehicle should be water soluble so as to drain away as a slip cast mold is dried, as noted hereinbelow.

Dispersant. A dispersant serves to ensure proper wetting of carbide particles. The dispersant may be a surfactant, having both polar and non-polar functionalities. The mixtures herein comprise about 0.1 pbw to about 5 pbw of a dispersant per 100 pbw silicon carbide, preferably about 1 to about 3 pbw. Suitable dispersants sold under the BYK® or Disperbyk® trademarks from BYK-Chemie of Wesel, Germany, include BYK110 (solution of copolymer with acidic group); BYK 111 (copolymer with acidic groups); BYK-180 (alkylolammonium salt of an acidic polyester). Also suitable are Duomeen® TDO (Akzo Nobel); Solsperse® 36600, a proprietary polymer mixed with aromatic hydrocarbon solvent; Solsperse® 13240, a mixture of polymeric amide and toluene; Solsperse® 20000, polymeric alkoxylate, and Aerosol® TR-70, sodium bistridecyl sulfosuccinate in water and ethanol. The Solsperse® and Aerosol® products are available from the Lubrizol Corporation of Cleveland, Ohio. Suitable wetting agents include Silvet® L-77, which is modified heptamethylsiloxane from Silberline Corporation, Tamaqua, Pa.

Particularly preferred are dispersants sold under the Darvan® name, available from RT Vanderbilt Co., Inc., Norwalk, Conn. The Darvan products are polyacrylic acid based deflocculants used to disperse ceramic suspensions to minimize their water content. Darvan 821-A and C are ammonium polyacrylate for electronic and specialty ceramic products. Each has a low ash content and each works well when prolonged ball milling or shear mixing are necessary. The presently most preferred dispersant is Darvan® 821A.

Spray Drying. Spray drying is used to produce a flowable powder having a narrow particle size distribution. A slurry is formed, for example, from dispersant-wetted powders of silicon carbide (SiC) and boron carbide ($B_4C$) are combined with a binder. The slurry typically is formulated to have about 45 to about 60 wt % solids loading. The slurry is sprayed through a fine heated nozzle into a chamber. The resultant powder has very dry (less than 0.2 wt % $H_2O$), nearly spherical particles.

Casting. The prepared mixture is formed into shapes by slip casting or pressure casting into porous molds. Plaster has been found to be appropriate for these forming molds. As the water (and dissolved binder therein) from the slip is drawn into the plaster mold, a solid layer of silicon carbide is built up. When the layer reaches the desired thickness, the remaining liquid is poured from the mold. This type of drain casting is familiar to those employed in the ceramic industry. When the formed shape has become firm, it can be removed from the mold and further dried in an oven to insure the removal of any remaining water. The shape is then ready for firing.

The cast shape is placed in a high temperature furnace in an inert nonreactive atmosphere (e.g., argon or other noble gas) wherein it is heated to a desired sintering temperature. Typically this temperature will be about 2000 to about 2200° C. Preferably, sintering is carried out at about 2100 to about 2200° C., more preferably about 2125° C. to about 2175° C. Most preferably, sintering is carried out at about 2150° C. The temperatures within the aforementioned ranges are selected to cause the production of gaseous SiO, which in turn produces "in situ pores" formed by vapor transport of the SiO into the SiC matrix. Such gaseous SiO results from reactions (I) and (II), which occur at firing temperatures of about 2100° C. to about 2200° C.

$$SiO_2 + C \rightarrow SiO(g) + CO(g) \qquad (I)$$

$$SiC + SiO_2 \rightarrow SiO(g) + CO(g) \qquad (II)$$

The resulting structure is illustrated in FIG. 1, which shows a uniformly porous crystal structure.

The method of the present invention yields a product having a matrix of sintered silicon carbide having a porosity between about 45% and 65% and a modulus of rupture of at least about 8000 psi.

The sintering temperature can be adjusted to afford a very narrow pore size distribution. The resulting pore sizes are typically less than one micron in diameter, and pore sizes of less than 0.5 microns can be achieved with variation of temperatures. This precise pore size control is achieved without the use of added polymers (i.e., lost wax casting), without the use of coatings of additional ceramic powder, and without the need for further sintering steps.

The invention further includes porous refractory compositions made by any method disclosed herein, as well as commercial products incorporating such refractory compositions. Candle filters and other filters used to remove unwanted particulates resulting from high-temperature combustion, are typical uses. The use of the disclosed porous refractories and products in armor plating is also envisioned. Other practical applications of the products disclosed herein will readily occur to those skilled in the art.

EXAMPLES. The invention will be more clearly understood by reference to the following example.

The following ingredients were combined: 100 grams of α-silicon carbide; 0.4 grams of boron carbide (both from Superior Graphite, Chicago, Ill.); 5.0 grams of an organic vehicle made of PVA, PEG, and water in a 250:1:20 weight ratio and 1% of a dispersant (Darvan 821A) to afford a slurry. These components were ball milled to form a slurry containing particles averaging less than 1 micron in diameter. At the completion of the mixing/milling process, the viscosity, specific gravity and dispersion quality were adjusted to assure that the values obtained were sufficient to produce the desired porosity in the finished product. The slurry had a viscosity of 300-600 cps and a solids loading of 60-65 wt %. Once the desired values were achieved, the resulting slurry was spray dried into a desired shape. Spray drying was performed in an Anhydro spray drier with inlet temperature of 610° F. and outlet temperature of 250° F.

Figure 2:
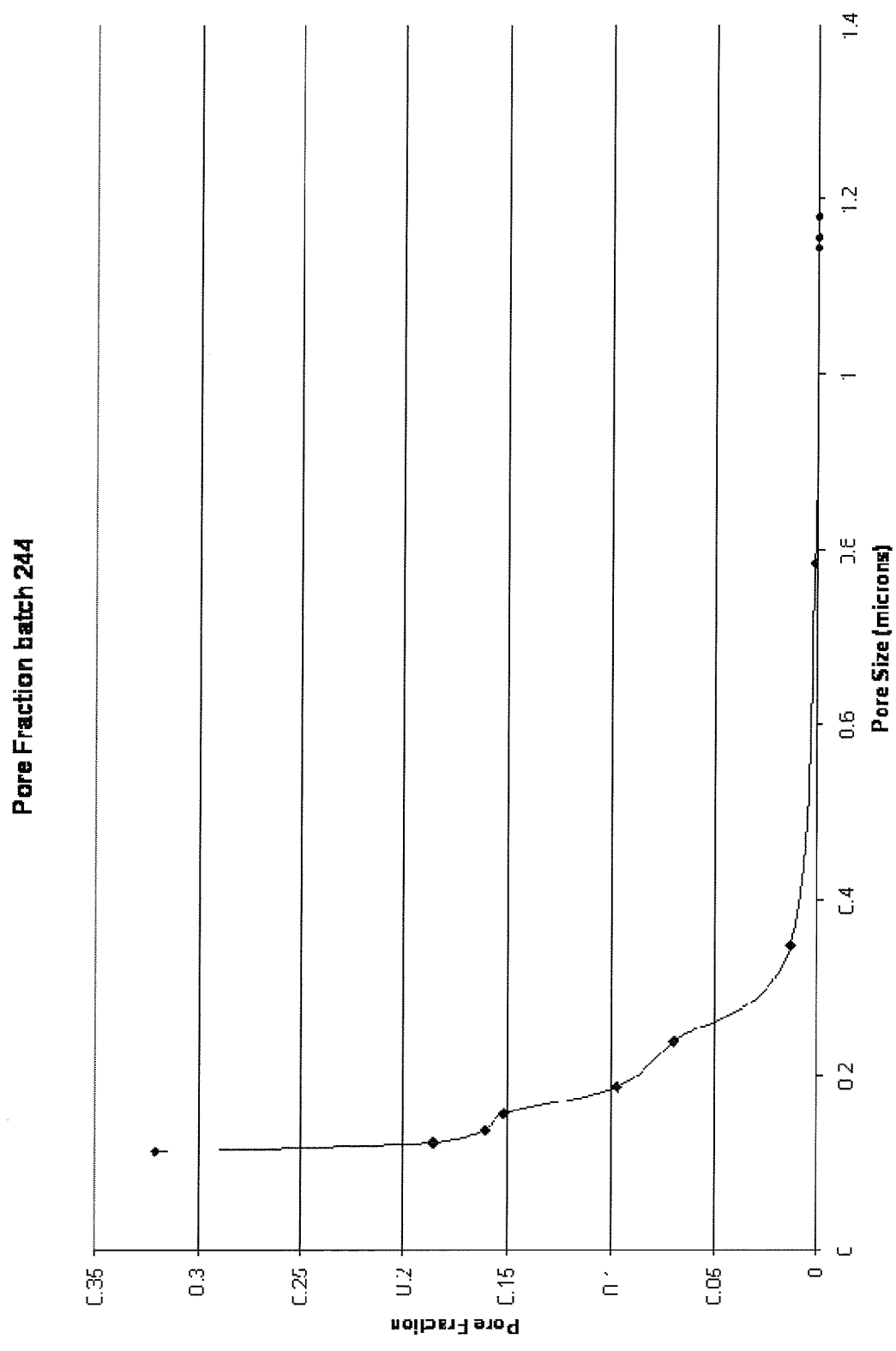
FIG. 2 is a graph showing the relationship of pore size vs. pore fraction for Batch 237.
Figure 3:
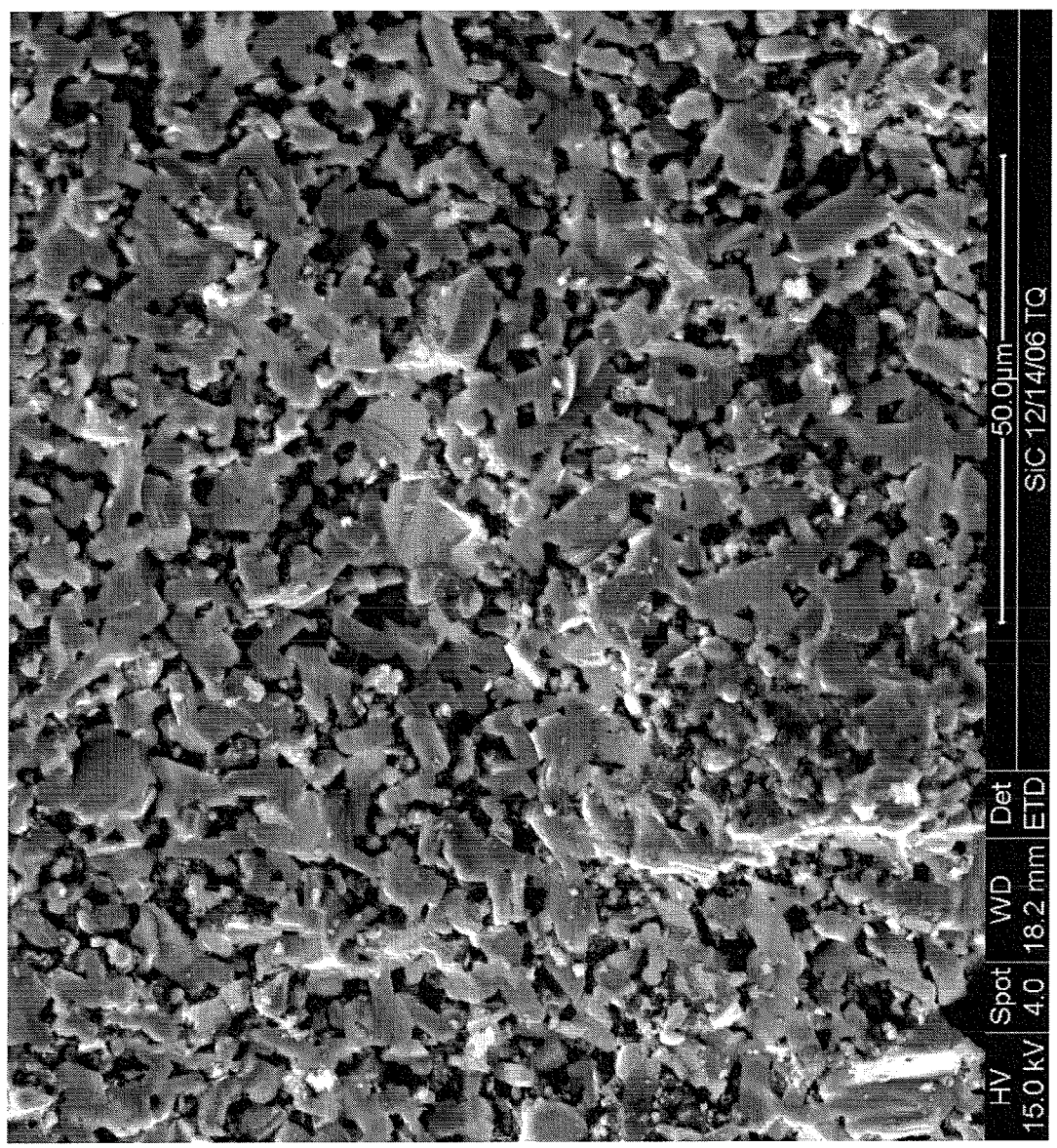
FIG. 3 is a graph showing the relationship of pore size vs. pore fraction for Batch 244.

The spray-dried slurry thus produced was placed in a drying oven to complete the drying process. Dried castings were removed from the drying oven and placed in a high temperature furnace and heated to a temperature of about 2150° C. An inert atmosphere of argon was maintained in the furnace during the firing to prevent oxidation of the silicon carbide. At this temperature, $SiO_2$ reacted with $B_4C$ such that gaseous SiO (boiling point 1880° C.) was formed. Further, a small portion of SiC reacted with $SiO_2$ to form gaseous SiO. Gaseous SiO is transported throughout the silicon carbide to form pores during sintering having an average pore size of about 0.7 microns. The bubble point flow diameter, in accordance with ASTM F316 is about 4-5 microns. Two batches of silicon carbide were made, batches 237 and 244. The batches were pressed into plates, 30 mm in diameter and 12-17 mm thick. The pore size was determined with a Porometer, and the porosity distributions (pore size vs. pore fraction) are shown in the graphs of FIGS. 2 and 3.

The plates exhibited a porosity such that 90% of pores fell within the range 0.1 to 0.4 microns in Batch 237, and over 95% of pores in Batch 244 fell within the range 0.1 to 0.4 microns. Tubes made from such silicon carbide had an average porosity of 48%, an average pore diameter of about 0.7 microns and a modulus of rupture of about 8000 to about 10,000 psi. These tubes were utilized in hot gas filtration operations such as coal fired smoke stacks, goal gasification processes, and diesel engine filtration systems (with or without a catalyst), and found to provide good filtration with lasting durability.

The porous ceramic product of the present invention may be used in a variety of applications including, but not limited to use in filter applications including high temperature filter applications, as diffusers and in the production of body armor.

Additional advantages and modifications will readily occur to those skilled in the art. Therefore, the invention in its broader aspects is not limited to the specific details and illustrative example shown and described herein. Accordingly, various modifications may be made without departing from the spirit or scope of the general invention concept as defined by the appended claims and their equivalents.

The invention claimed is:

1. A method of making a permeable refractory product having a porosity of about 45% to about 65%, comprising forming by spray drying and heating in a noble gas atmosphere a mixture comprising alpha-silicon carbide and boron carbide each having a particle size of less than about 1 micron, the silicon carbide particles forming gaseous SiO within the silicon carbide matrix to form pores having an average size of less than about 1 micron.

2. The method of claim 1, wherein the heating is carried out at a temperature of about 2000 to about 2200° C. for such a time as required to achieve an average porosity of about 45% to about 65% by volume.

3. The method of claim 1, wherein the heating is carried out at about 2100 to about 2200° C.

4. The method of claim 1 wherein the sintering is carried out at about 2125 to about 2175° C.

5. A method of making a porous silicon carbide article comprising:
   a. combining to form a mixture
      i. 100 parts by weight of α-silicon carbide having a particle size of 0.5 microns to 10 microns;
      ii. 0.2-1 parts by weight of boron carbide; and
      iii. 1-10 parts by weight of an organic vehicle;
   b. milling the mixture for homogeneity and particle size reduction such that the carbide particle sizes ($D_{50}$) are less than about 1 micron;
   c. forming the mixture into a desired shape and
   d. sintering the formed mixture in a noble gas atmosphere at a temperature of about 2000 to about 2200° C. for such a time as required to achieve an average porosity of about 45% to about 65% by volume.

6. The method of claim 5, wherein the sintering is carried out at about 2100 to about 2200° C.

7. The method of claim 6, wherein the sintering is carried out at about 2125 to about 2175° C.

8. The method of claim 6, wherein forming the mixture into a desired shape comprises:
   a. combining the silicon carbide and boron carbide with an organic vehicle to form a green body, wherein the binder comprises a dispersant and a solvent, and
   b. forming a slurry having a viscosity of about 200 to about 700 cps, and a solids loading of about 45 to about 70 wt %.

9. A method of making a porous silicon carbide article comprising:
   a. combining to form a mixture that is devoid of free carbon and free silicon
      i. 100 parts by weight of α-silicon carbide having a particle size of 0.5 microns to 10 microns;
      ii. 0.2-1 parts by weight of boron carbide; and
      iii. 1-10 parts by weight of an organic vehicle;
   b. milling the mixture for homogeneity and particle size reduction such that the carbide particle sizes ($D_{50}$) are less than about 1 micron;
   c. forming the mixture into a desired shape and
   d. sintering the formed mixture in a noble gas atmosphere at a temperature of about 2000 to about 2200° C. for such a time as required to achieve an average porosity of about 30% to about 70%.

10. The method of claim 9, wherein the sintering is carried out at about 2100 to about 2200° C.

11. The method of claim 9, wherein the sintering is carried out at about 2125 to about 2175° C.

12. The method of claim 9, wherein forming the mixture into a desired shape comprises
   a. combining the silicon carbide and boron carbide with an organic vehicle to form a green body, wherein the binder comprises a dispersant and a solvent selected from the group consisting of PVA, PEG, and combinations thereof,
   b. forming a slip from the green body, the slip having a viscosity of about 200 to about 700 cps, and a solids loading of about 45 to about 75 wt %.

* * * * *